Aug. 22, 1939.  H. R. CLAPPER  2,170,493
APPARATUS FOR DETERMINING BEARING PLAY
Filed June 6, 1938
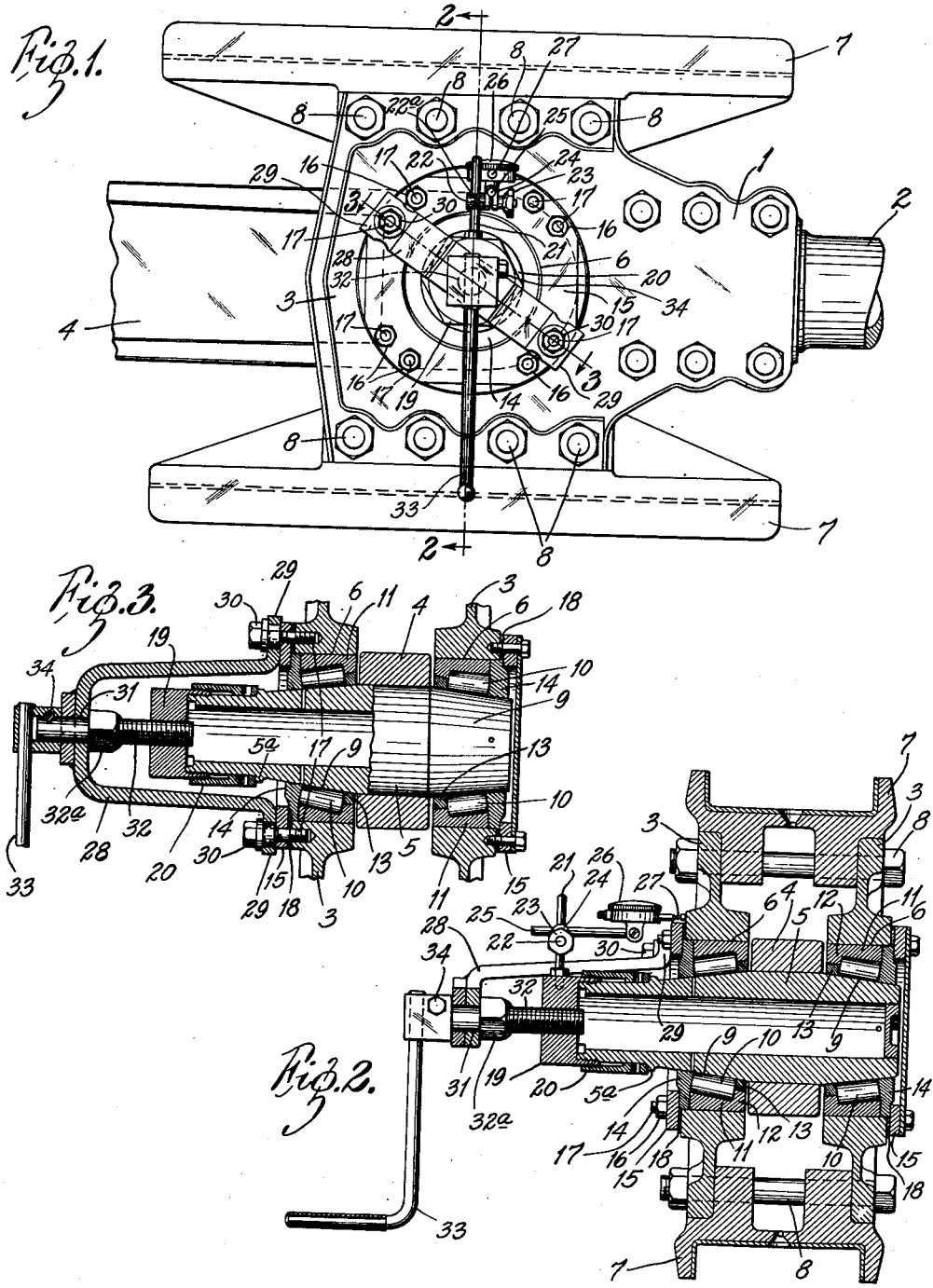
INVENTOR:
Harland R. Clapper,
by Carr Carr Gravely
HIS ATTORNEYS.

Patented Aug. 22, 1939

2,170,493

UNITED STATES PATENT OFFICE 2,170,493

APPARATUS FOR DETERMINING BEARING PLAY

Harland R. Clapper, Canton, Ohio, assignor to The Timken Roller Bearing Company, Canton, Ohio, a corporation of Ohio Application June 6, 1938, Serial No. 212,027

6 Claims. (Cl. 33—172)

This invention relates to the adjustment of roller bearings, particularly tapered locomotive crosshead bearings of the type that are adjusted by means of shims. Heretofore it has been a difficult matter to determine the exact shim thickness required for the proper adjustment of the bearings; and the principal object of the present invention is to devise a practical and economical apparatus for accurately determining the amount of bearing play and process of adjustment therefor. The invention consists in the apparatus and process hereinafter described and claimed.

In the accompanying drawing, which forms part of this specification and wherein like symbols refer to like parts wherever they occur:

Fig. 1 is a side elevation of a roller bearing locomotive crosshead construction provided with an apparatus embodying my invention for determining the endwise play of the bearings; and Figs. 2 and 3 are sections on the lines 2—2 and 3—3, respectively, in Fig. 1.

In the accompanying drawing, my invention is illustrated in connection with a locomotive crosshead of the type shown in Buckwalter Patent No. 2,037,209, wherein a yoke member has a shank portion 1, which receives a piston rod 2, and branches 3 between which a main rod 4 is pivotally secured by means of a wrist pin 5 that extends through alined openings 6 in said branches and has a press-fit in said main rod. Guide shoes 7 of channel-shaped cross-section are rigidly secured by bolts 8 between the yoke branches 3 above and below the wrist pin 5.

The wrist pin 5 has raceway portions 9 that taper away from the main rod 2, and tapered bearing rollers 10 are mounted on said raceway portions. Cups or outer bearing members 11 fit in the openings 6 in the branches 3 of the yoke member and have internal thrust ribs 12 at the large ends of their conical raceways for engagement with the large ends of the conical bearing rollers 10. A bronze wear ring 13 has a tight fit in the thrust rib 12, a slight clearance being provided between said ring and the portion of the wrist pin 5 surrounded thereby.

At the outer ends of the cups 11 are annular closure plates 14 that fit in the openings 6 in the yoke branches 3 and are held therein in abutting engagement with said ends of said cups by means of positioning and retaining rings 15 that are secured to the yoke branches 3 by nuts 16 threaded on circular series of studs 17 that are threaded into said branches and extend through holes provided therefor in said plates. These plates serve as ribs for closely confining the small or outer ends of the rollers 10 and extend into close proximity to the raceway portions 9 of the wrist pin 5. Adjustment of the bearings is obtained by means of shims 18 interposed between the retaining rings 15 and the yoke branches 3.

According to the present invention, the exact shim thickness required for the proper adjustment of the bearings of the hereinbefore described locomotive crosshead construction is determined by an apparatus comprising a cap nut 19, which is threaded on the threaded outer end of the wrist pin 5, and a jam nut comprising a sleeve 20, which is threaded on the inner end of said cap nut with its inner end disposed in abutting relation to an annular shoulder 5a formed on said wrist pin, thereby preventing relative rotation of said cap nut and wrist pin and play between the threads thereof.

Rigidly secured to the cap nut 19 and extending radially outwardly thereof is a post 21 having a laterally extending stud 22 threaded to receive a clamp nut 23. Sleeved on the stud 22 between a shoulder 22a thereon and the clamp nut 23 is a split block 24 having a rod 25 clamped therein. This rod extends longitudinally of the wrist pin axis in the direction of the adjacent yoke branch 3 and has a suitable dial indicator 26 mounted thereon having a stem 27 disposed in abutting relation to said branch.

Straddling the outer end of the wrist pin 5 and the cap nut 19 and jam nut 20 thereon is a U-shaped frame or bracket 28 having outstanding foot flanges 29 at the free ends of its diverging arms adapted to seat against the outer face of the adjacent retaining ring 15. Said foot flanges are rigidly clamped to the ring 15 by means of collar nuts 30 that engage two diametrically disposed studs 17 from which the nuts 16 have been removed. The closed cap nut opposing outer end of the U-shaped frame member or bracket 28 has a hole 31 extending therethrough in axial alinement with the wrist pin axis; and a rotary shaft 32 has one end threaded through an axial bore in the cap nut 19 and its other end extended through and guided in the hole in said bracket. The shaft 32 has a crank 33 removably secured thereto beyond the outer end of the bracket 28 by means of a cap screw 34. The hub of the crank 33 is disposed in abutting relation to the outer face of the closed outer end portion of the bracket 28 and the shaft 32 has a flat-sided enlargement 32a disposed in abutting relation to the inner face of said portion of said bracket, thereby preventing axial movement of said shaft. When the crank 33 is turned, the threaded inner end of the shaft 32 turns in the threaded bore of the cap nut 19 and causes said nut to travel along said shaft and move the wrist pin 5 axially, the direction of such movement depending upon the direction in which said crank is rotated.

The operation of adjusting the bearings of the above roller bearing construction is as follows: The apparatus is attached to the crosshead in the manner shown and described with a nominal thickness of shims between the branches 3 of the crosshead yoke and the bearing retaining rings 15. The crank 33 is then turned to shift the wrist pin 5 axially in one direction, to bring the rollers of one bearing solid against the respective raceways thereof. The dial indicator 26 is then set to zero with its stem 27 in contact with the adjacent yoke branch. The crank is then turned in the opposite direction to bring the rollers of the other bearing solid against its raceways. In this position of the parts, the indicator reading indicates the total amount of play of both bearings. Shims of a thickness corresponding to the dimension shown on the indicator, minus the slight clearance required for proper adjustment of the bearings, are then removed from either or both sides of the crosshead, depending on whether the main rod 4 is centrally positioned between the yoke branches. If the indicator reading indicates that the bearing play is less than that required for proper running adjustment of the bearings, shims of proper thickness are added to the crosshead.

By the arrangement described, the bearings may be readily adjusted with great precision. The power is easily applied and controlled; the amount of bearing play is accurately indicated; there is no tendency for the assembled parts to cock under the endwise pushing or pulling forces applied thereto by the apparatus; and the indicator reading is not affected by spring of the frame parts of the apparatus.

While my apparatus is especially useful in the adjustment of roller bearing locomotive crosshead constructions, it is also applicable to other roller bearing constructions which require accurate adjustment of the bearings and are heavy enough to be difficult to handle manually.

What I claim is:

1. Apparatus for use in determining the bearing play of a roller bearing construction comprising two series of axially spaced reversely tapered bearing rollers interposed between relatively rotatable inner and outer members, said apparatus comprising a bracket adapted to be removably connected to a fixed portion of said construction, a member adapted to be removably connected to said inner member and having a threaded opening in axial alinement therewith, a shaft supported in said bracket for rotary but non-axial sliding movement therein and having a threaded engagement with the threaded opening in the member secured to said inner member, whereby rotation of said shaft shifts said inner member axially of said outer member in either direction, and a member supported by and movable with the member secured to said inner member and cooperating with said fixed portion for indicating the total amount of endwise play of both bearings.

2. Apparatus for use in determining the bearing play of roller bearing constructions wherein bearing rollers are interposed between relatively rotatable inner and outer members, said apparatus comprising a shaft having a threaded portion, means for temporarily mounting said shaft for rotary but nonaxial sliding movement on said roller bearing construction, a member adapted to be temporarily secured to one of said inner and outer members of said roller bearing construction and having threaded engagement with the threaded portion of said shaft so as to be moved thereby axially of the other of said inner and outer members of said roller bearing construction when said shaft is rotated, and an indicator supported by and movable with the threaded shaft receiving member and cooperating with said other member of said roller bearing construction to indicate the amount of movement of said axially movable member of said roller bearing construction.

3. Apparatus for use in determining the bearing play of roller bearing constructions wherein tapered bearing rollers are interposed between relatively rotatable inner and outer members, said apparatus comprising a member adapted to be temporarily secured to one end of said inner member and having a threaded bore disposed in axial alinement therewith, an indicator supported on the member fixed to said inner member in abutting relation to said outer member, a bracket adapted to be temporarily secured to said outer member, and a shaft supported on said bracket for rotary but non-axial sliding movement and having threaded engagement with the threaded bore in the member secured to said inner member, whereby rotation of said shaft causes endwise movement of said inner member and the indicator movable therewith indicates the amount of endwise play of said bearing.

4. Apparatus for use in determining the bearing play of roller bearing constructions wherein two series of axially spaced reversely tapered bearing rollers are interposed between relatively rotatable inner and outer members, said apparatus comprising a member adapted to be temporarily secured to one end of said inner member and having a threaded bore disposed in axial alinement therewith, an indicator supported on the member fixed to said inner member in abutting relation to said outer member, a bracket adapted to be temporarily secured to said outer member, and a shaft supported on said bracket for rotary but non-axial sliding movement and having threaded engagement with the threaded bore in the member fixed to said inner member, whereby rotation of said shaft causes endwise movement of said inner member and the indicator movable therewith indicates the total amount of endwise play of both bearings.

5. Apparatus of the kind described comprising a cap nut adapted to be threaded on one end of the wrist pin of a roller bearing locomotive crosshead and having a threaded axial bore disposed in axial alinement with said pin, a dial indicator supported by said cap nut and adapted to engage the adjacent side of said crosshead, a frame adapted to be temporarily secured to said crosshead and having a portion located opposite said cap nut with a bore therethrough in axial alinement with the threaded bore of said cap nut, a shaft having a portion rotatable in the bore of said frame, a threaded portion engaging the threaded bore of said cap nut and a shoulder disposed in abutting relation to said portion of said frame, and a manually rotatable crank fixed to the outer end of said shaft in abutting relation to said portion of said frame.

6. Apparatus for determining the bearing play of roller bearing locomotive crosshead constructions wherein two axially spaced tapered roller bearings are mounted in the yoke of said crosshead, a rod supporting wrist pin has its ends supported in said bearings and shims interposed between said yoke and retaining rings for said bearings for adjusting the latter, said apparatus comprising a cap nut threaded on one end of said wrist pin and having a threaded axial bore disposed in axial alinement therewith, a dial indicator supported by said cap nut and adapted to engage the adjacent face of said yoke, a frame straddling said end of said pin and adapted to be temporarily secured to said yoke and having a portion located opposite said cap nut with a bore therethrough in axial alinement with the threaded bore of said cap nut, a shaft having a portion rotatable in the bore of said frame, a threaded portion engaging the threaded bore of said cap nut and a shoulder disposed in abutting relation to said portion of said frame, and a manually rotatable crank fixed to the outer end of said shaft in abutting relation to said portion of said frame, whereby said crank is adapted to be rotated to shift said pin axially to take up the play of said bearings and the indicator is adapted to indicate the thickness of shims required for proper adjustment of said bearings.

HARLAND R. CLAPPER.